United States Patent [19]

Thiboutot

[11] 4,339,141

[45] Jul. 13, 1982

[54] COLLAPSIBLE FOLDING CART

[75] Inventor: Robert Thiboutot, Lac St. Charles, Canada

[73] Assignee: Les Entreprises Rotot Ltee, St-Etienne de Beaumont, Canada

[21] Appl. No.: 187,988

[22] Filed: Sep. 17, 1980

[51] Int. Cl.³ .............................................. B62B 3/02
[52] U.S. Cl. ...................................... 280/652; 280/42
[58] Field of Search ................. 280/652, 651, 655, 42, 280/638, 654, 646, 47.13 R, 47.17, 47.24, 47.26

[56] References Cited

U.S. PATENT DOCUMENTS

| | | | |
|---|---|---|---|
| 2,020,766 | 11/1935 | Brown | 280/651 X |
| 2,920,900 | 1/1960 | Best | 280/652 |
| 3,514,123 | 5/1970 | Injeski | 280/652 |
| 3,968,991 | 7/1976 | Maclaren | 297/45 |
| 4,185,848 | 1/1980 | Holtz | 280/652 |

*Primary Examiner*—Joseph F. Peters, Jr.
*Assistant Examiner*—Donald W. Underwood
*Attorney, Agent, or Firm*—Fleit & Jacobson

[57] ABSTRACT

A collapsible folding cart movable between an erected condition and a collapsed condition. The cart has front, side, and rear frameworks interconnected by corner posts. A bottom framework is connected to bottom portions of the front, side, and rear frameworks. Handles are connected to sides of the cart in such manner that the handles can be moved between a diagonal position when the cart is erected and a position substantially parallel to the axes of the corner posts when the cart is collapsed. Lower corner portions of the front and side frameworks and lower portions of the rear and side frameworks are interconnected to each other in such manner that, during collapse of the cart, the breadth and width of the cart are simultaneously reduced. The various components of the cart are interconnected in such manner that the frameworks are collapsible to reduce the overall breadth and width of the cart, and to increase the length of the collapsed cart.

5 Claims, 7 Drawing Figures

COLLAPSIBLE FOLDING CART

BACKGROUND OF THE INVENTION

The present invention relates generally to collapsible package and article carriers and, more particularly, to collapsible shopping carts or baskets. The invention provides a collapsible shopping cart that is sufficiently sturdy for load-carrying and other normal abuse during its utilization and yet is collapsible into an optimum, minimum size during storage or periods of non-use.

SUMMARY OF THE INVENTION

The present invention provides a collapsible folding shopping cart that is movable between a first, erected condition and a second, collapsed condition. The cart has two parallel posts forming front corners and two parallel posts forming rear corners of the cart. The front posts are interconnected by a collapsible front framework, while the rear posts are interconnected by a collapsible rear framework. Side frameworks interconnect respective ones of the front and rear posts. A bottom framework is pivotally and hingedly connected to lowermost portions of the front, side, and rear frameworks. Each of the front and rear frameworks is comprised of vertically spaced-apart link assemblies having link members with distal ends pivotally connected to the corner posts and proximal ends pivotally connected to each other. A bar is connected to the points of pivotal interconnection of the proximal ends of the link members in such manner that upward movement of the bar results in rotation of the link members and collapsing of the framework so that the front or rear bars move towards each other. Preferably, the bottom ends of the bars of the front and rear frameworks are operatively associated or connected to each other by a central support member hingedly connected to the front and rear framework and forming part of the bottom framework so that an upward force exerted on one of the bars is transmitted to the other bar.

Each of the side frameworks is formed of a plurality of vertically spaced apart link elements having ends thereof pivotally connected to respective ones of the front and rear posts so that the link elements are rotatable with respect to the posts. During collapse of the cart, the front posts move in vertical planes towards the rear posts to thereby reduce the depths of the basket.

Handles are rotatably connected to each of the side frameworks in such manner that when the cart is in an erected position, the handles extend diagonally from the lower front to the upper rear of the cart, with lower portions of the handles projecting below the bottom framework to form legs for supporting the cart and upper portions of the handles projecting above the frameworks to form grips. A lower portion of each of the handles passes through a sleeve pivotally connected to a protruding portion of a first diagonal support member or assembly. The first diagonal support member has a lower end pivotally connected to a lowermost link element of the side framework and an upper end extending past a respective one of the front corner posts. A second diagonal support assembly or member formed of pivotally interconnected support elements has a lower end connected to a lowermost link assembly of the front framework and an upper end positioned closely spaced from the upper end of the first diagonal support member. Corner connection means are provided for interconnecting the upper ends of the diagonal support members in such manner that the diagonal support members are movable in intersecting vertical planes. An upper portion of the handle passes through a sleeve pivotally connected to the uppermost link element of a respective one of the side frameworks. The handle passes through the upper and lower sleeves in such manner that the handle is translatable to a limited extent with respect to the sleeves, but is prevented from rotational movement within the sleeves. The relationship between the handles, sleeves, and side frameworks is such that the handles are movable into positions substantially parallel to the posts when the cart is collapsed.

A sleeve is slidably guided by a lower portion of each of the rear corner posts. The sleeve is pivotally connected by first and second diagonal support members to a lowermost link element of the side framework and a lowermost link assembly of the rear framework so that upward movement of the side framework results in conjoint movement of the side framework.

The bottom framework, in addition to the central support member, includes bottom members extending between the central support member and lowermost link elements of the side frameworks. Ends of the bottom members are hingedly and pivotally connected to the central support member and one of the link elements so that both the depth and width of the bottom framework are reduced during movement of the cart from the erected to the folded condition.

The invention, and its objects and advantages, will become more apparent in the detailed description of the preferred embodiment hereinafter presented.

BRIEF DESCRIPTION OF THE DRAWINGS

In the detailed description of the preferred embodiment of the invention hereinafter presented, reference is made to the accompanying drawings, in which.

DESCRIPTION OF THE PREFERRED EMBODIMENT

Because collapsible folding carts are well-known, the present description will be directed in particular to elements forming part of, or cooperating more directly with, the present invention. Elements not specifically shown or described herein are understood to be selectable from those known in the art.

In the following description, terms such as "right," "left," "front," "top," "horizontal," and "vertical" will be used. Such terms are being used in conjunction with the structure illustrated in the drawings and are not intended to limit the description to a particular orientation of components. These terms are being used simply to facilitate the following description.

Figure 1:
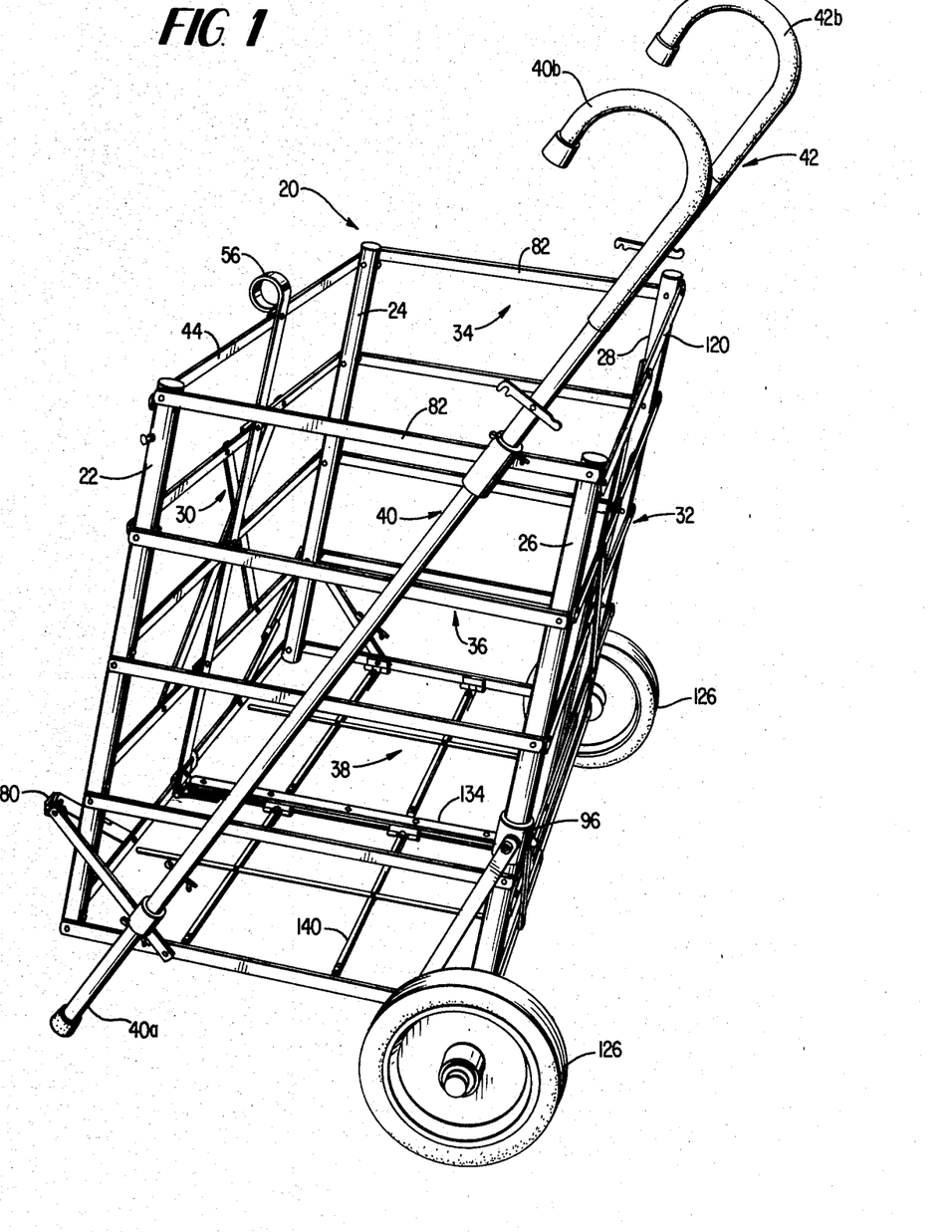
FIG. 1 is a side perspective of one embodiment of an inventive collapsible folding cart according to the present invention.

Referring now to the drawings, and to FIG. 1 in particular, one embodiment of a collapsible folding cart according to the present invention, generally designated 20, is illustrated. The cart 20 has two front corner posts 22 and 24 and two rear corner posts 26 and 28. Preferably, the corner posts are formed of hollow tubular material; however, solid members can be used. A front framework, generally designated 30, is positioned between and pivotally connected to the front posts 22 and 24. A rear framework, generally designated 32, is positioned between and pivotally connected to the rear posts 26 and 28. A left-side framework, generally designated 34, is positioned between and pivotally connected to the posts 24 and 28. A right-side framework, generally designated 36, is positioned between and connected to the posts 22 and 26. A bottom framework, generally designated 38 forms the bottom of the cart 20 and is hingedly or hingedly and pivotally connected to lowermost portions of the front, rear, and side frameworks. All of the frameworks utilize hollow tubular plastic or metal components; solid plastic or metal components, such as rods and bars; or a combination of tubular and solid components. It will be appreciated that other suitable materials can also be used to form the frameworks.

Longitudinally-extending handles, generally designated 40 and 42, are pivotally interconnected to the side frameworks 36 and 34, respectively. Each of the handles has a lowermost portion, only one of which designated 40a can be seen in FIG. 1, extending below the bottom framework 38 to form a leg for supporting the cart in its unfolded condition. Uppermost portions of the handles, designated 40b and 42b, respectively, form grips that can be grasped by a user of the cart to facilitate its movement. When the cart is fully erected, as illustrated in FIG. 1, the longitudinal axes of the handles extend diagonally from lower front corners of the cart upwardly towards the rear corners of the cart. When the cart is fully collapsed, the handles are moved together with the side frameworks and are rotated with respect to the frameworks so that the axes of the handles are substantially parallel with the axes of the rear posts.

Figure 2:
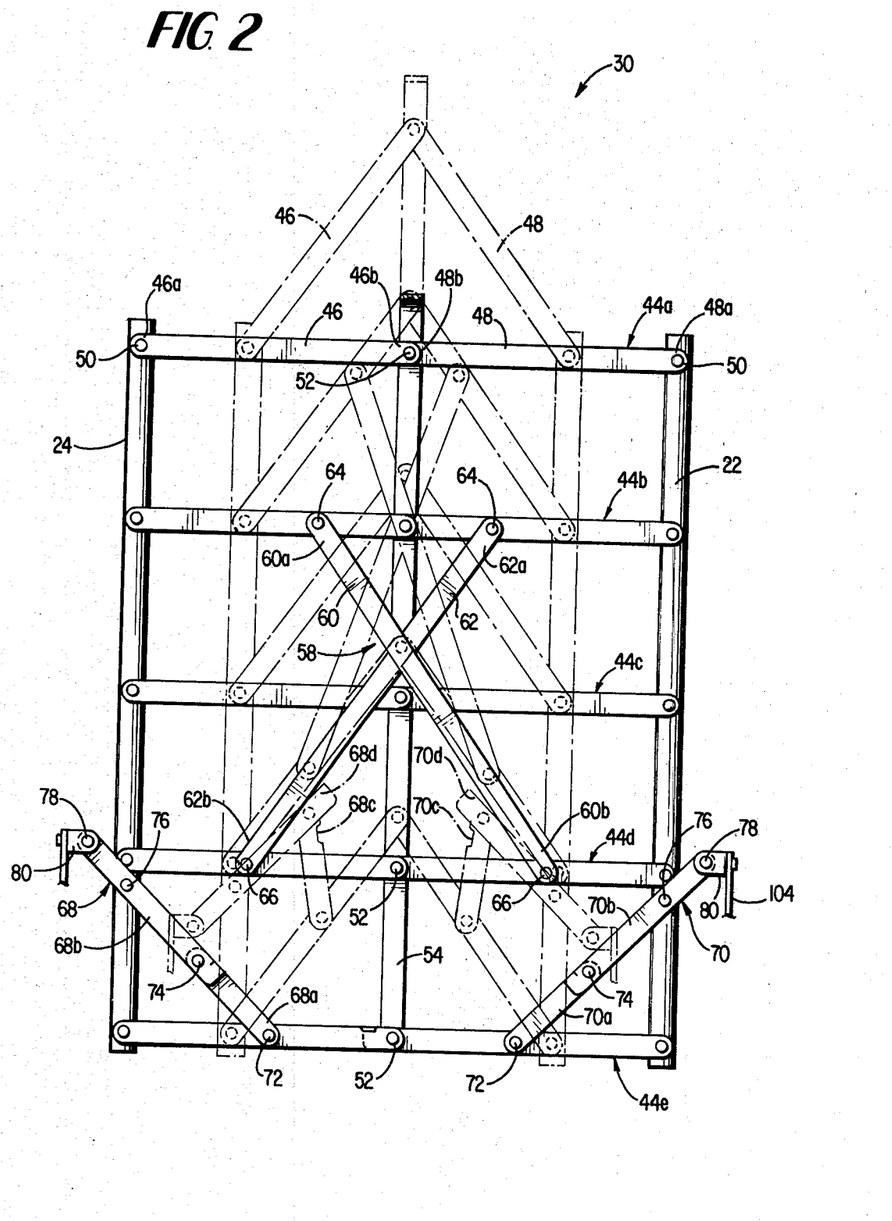
FIG. 2 is a plan view of the front of the cart of FIG. 1, with the erected position of the front being shown in full lines and a partially collapsed position being shown in phantom.

Referring now to FIG. 2, the components of the front framework 30 are illustrated. For the purposes of simplicity, structure located rearwardly of the front framework is not illustrated. The front framework 30 is comprised of a plurality of link assemblies, generally designated 44a, 44b, 44c, 44d, and 44e. For the purposes of simplicity, the reference numeral "44" will be used to generically identify the link assemblies. Each of the link assemblies 44 is comprised of a pair of link members 46 and 48. Pivot connection means 50 are used to rotatably connect distal ends 46a and 48a of the link members to the posts 22 and 24. Pivot connection means 52 rotatably interconnect confronting proximal ends 46b and 48b of the link members to each other. A bar 54, preferably having a loop 56 formed at its upper end, is connected to each of the pivot connection means 52 so that upward movement of the bar 54 results in conjoint upward movement of all of the proximal ends of the link members. In this manner, the link members are rotated with respect to the front posts 22 and 24 so that the posts are moved towards each other to reduce the overall width of the front of the cart 20. Preferably, the proximal ends of at least one set of the link members are designed to be locked in a horizontal position. For instance, the proximal end 48b of the lowermost link member 48 has a recessed upper surface and the proximal end 46b of the lowermost link member is formed with a protruding tabular portion that seats in the recess to hold the link assembly 44e in a substantially horizontal position. Since the bar 54 rigidly interconnects all of the pivot connection means 52, all of the link assemblies are held in substantially horizontal positions. An X-frame, generally designed 58, is provided to rigidify the front framework in its erected condition. The X-frame 58 has crossed members 60 and 62 with upper ends 60a, 62a connected by pivot connection means 64 to an upper one of the link assemblies, for instance, link assembly 44b. Lower ends 60b, 62b of the crossed members are connected by pivot connection means 66 to a lower one of the link assemblies, for instance, link assembly 44d. Preferably, the link members of the link assembly 44d have longitudinally-extending slots formed therein for receiving the pivot connection means 66 so that the lower ends of the crossed members are horizontally movable to a limited degree with respect to the link assembly to facilitate collapsing movement of the front framework.

Diagonal support assemblies, generally designated 68 and 70, are provided at lower corners of the front to assist in rigidfying the front framework. Each of the support assemblies has a first support element (68a, 70a) with a lower end connected by pivot connection means 72 to link members of the lowermost link assembly 44e. Upper ends of the lower support elements are connected by pivot connection means 74 to lower ends of upper support elements 68b and 70b, respectively. The upper support elements are connected to the posts intermediate the ends of the upper support elements by pivot connection means 76. Upper ends of the upper support elements 68b, 70b are connected by pivot connection means 78 to one leg of a corner connection means, such as an L-shaped bracket 80. As will be described in more detail hereinafter, the bracket 80 makes possible rotational movement of the diagonal support assemblies 68, 70 in a vertical plane parallel to the axes of the bars 22, 24.

As can be seen from the phantom line positions of the diagonal support assemblies 68 and 70, the lower support elements (68a, 70a) have recesses (68c, 70c) formed in their upper ends for receiving tabs protruding from the lower end of the upper support elements (68b, 70b). The tabs cooperate with the recesses to facilitate holding the link assemblies of the front framework in horizontal positions.

FIG. 2 illustrates in solid lines the position of the front when the cart is fully erected. Phantom lines are used in the figure to illustrate an intermediate position of the front during either collapse or erection of the cart. It should be appreciated that when the cart is fully collapsed, the bars 22 and 24 are positioned almost in contact with opposite side edges of the bar 54. Thus, the front framework 30 is collapsible to significantly reduce its overall width.

Figure 3:
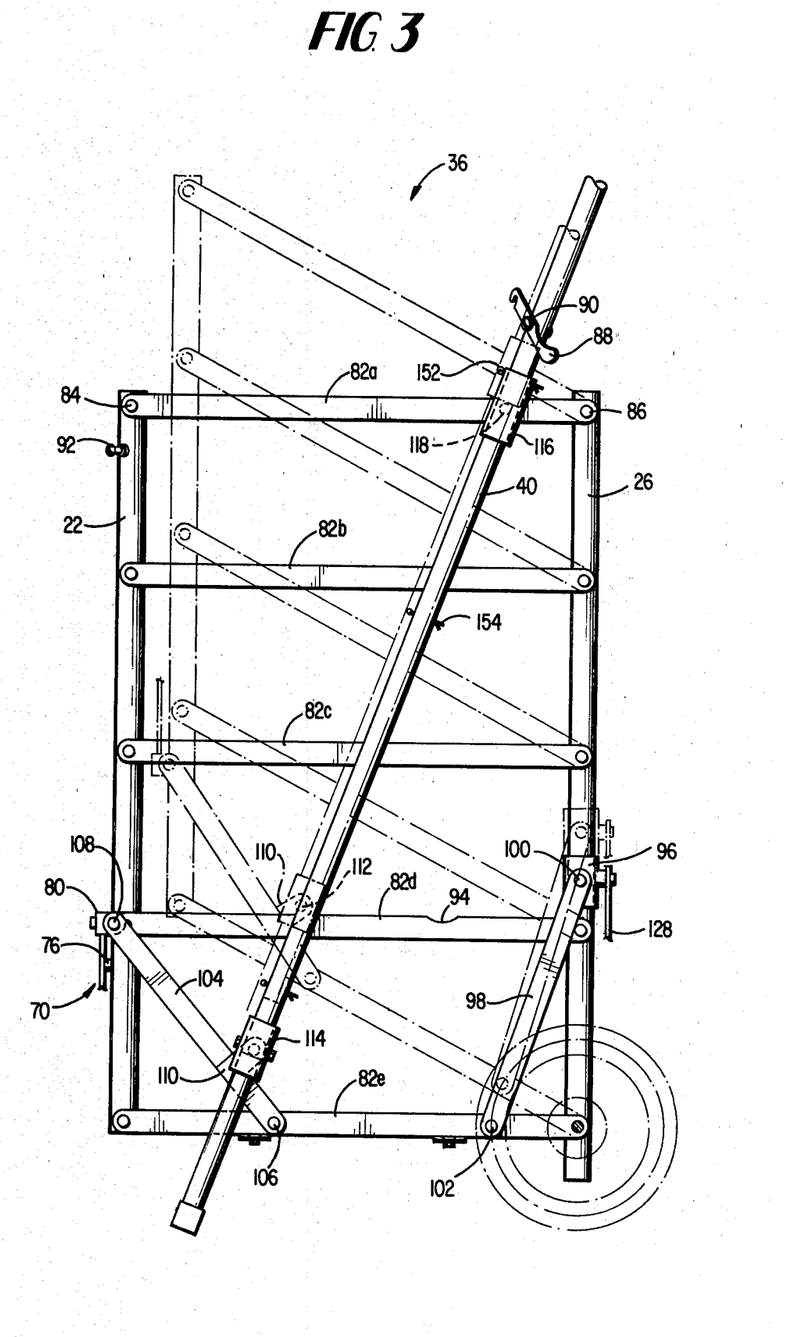
FIG. 3 is a plan view, similar to FIG. 2, of the side of the cart of FIG. 1.

Referring now to FIG. 3, the right-side framework 36 is illustrated. The left-side framework 34 utilizes the same components as those that will be hereinafter discussed.

The side framework 36 is formed of a plurality of link elements 82a, 82b, 82c, 82d, and 82e. For the purposes of convenience, the link elements will hereinafter be referred to generically with the reference numeral 82. Leading or front ends of the link elements 82 are connected by pivot connection means 84 to the front posts 22. In a similar manner, pivot connection means 86 connect rear or trailing ends of the link elements to the rear posts 26. As illustrated in phantom in FIG. 3, the link elements make possible movement of the bar 22 in a vertical plane towards the bar 26. In this manner, the link elements make it possible to reduce the overall depth of the sides of the cart 20. After the cart has been fully collapsed, the front post 22 and the handle 40 are positioned parallel to and closely spaced from the rear post 26. When the members are in this position, latching elements 88 connected by pivot connection means 90 to the handles 40 and 42 are engaged with lock posts 92 carried by the front posts 22 and 24. Preferably, the latching elements 88 are offset along their axes to provide clearance between the collapsed members. When the latching element 88 is engaged with the lock post 92, the cart 20 is reliably maintained in its collapsed, folded condition.

To facilitate clearance between the collapsed components, one or more of the link elements 82 is preferably formed with recessed portions, such as the recessed portion 94 in link element 83d. This recess provides clearance between the link element 82d and a sleeve 96 slidably carried by the post 26. A diagonal support member 98 has an upper end connected by pivot connection means 100 to the sleeve 96 and a lower end connected by pivot connection means 102 to the link element 82e. As will be described in more detail hereinafter, the sleeve 96 ensures conjoint movement between the side framework 36 and the rear framework 32 during movement of the cart 20 between collapsed and erected conditions, or during movement of the cart between erected and collapsed conditions.

At the front of the side framework, a diagonal support assembly 104 has a lower end connected by pivot connection means 106 to the lowermost link element 82e. The upper end of the diagonal support assembly 104 is connected to one leg of the L-shaped bracket 80 by pivot connection means 108. The L-shaped bracket 80 is designed to permit movement of the diagonal support assembly 104 in a plane parallel to the axes of the posts 22 and 26. This movement occurs simultaneously with the movement of the diagonal support assembly 70 in the plane defined by the front posts. Thus, the L-shaped bracket 80 provides for simultaneous movement of the components of the front and side in two intersecting planes.

The diagonal support assembly 104 includes an upstanding bracket 110 positioned intermediate its ends. Bracket 110 receives a pivot connection means 112 for rotatably connecting a sleeve 114 to the diagonal support assembly 104. The sleeve 114 receives a lower portion of handle 40. A second sleeve 116 receiving an upper portion of the handle 40 is connected by pivot connection means 118 to the uppermost link element 82a. As will be described in more detail hereinafter, provision of the sleeves 114 and 116 makes possible the movement of handle 40 between a position wherein its axis extends diagonally with respect to the posts 22 and 26 and a position wherein its axis is substantially parallel with the posts.

Figure 4:
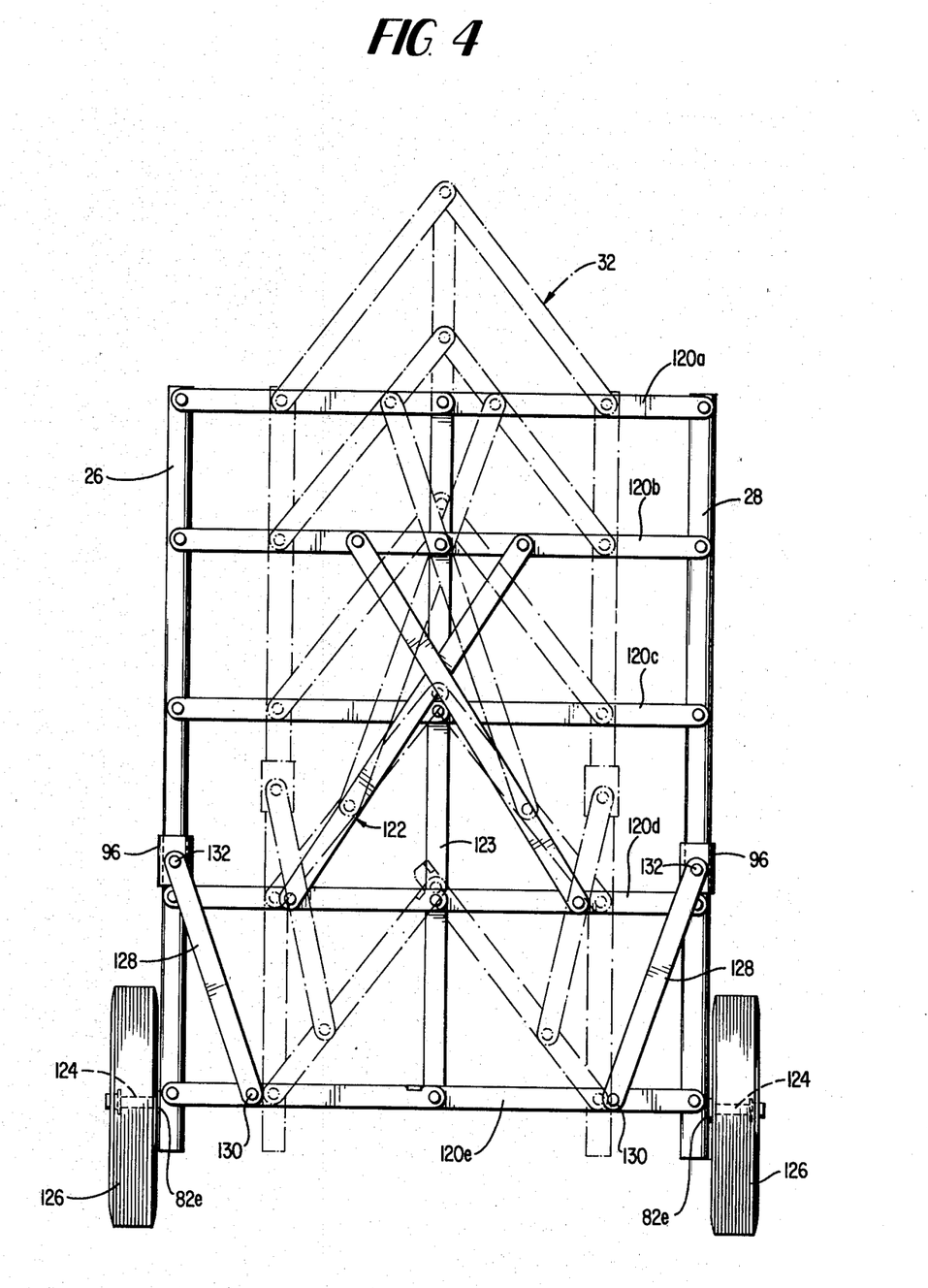
FIG. 4 is a plan view, similar to FIG. 2, of the rear of the cart of FIG. 1.

Referring now to FIG. 4, the rear of the cart is illustrated. The rear of the cart is formed by the interconnected rear framework 32 and rear posts 26 and 28. The rear framework 32 comprises a plurality of link assemblies 120a, 120b, 120c, 120d, and 120e. For the purposes of convenience, these link assemblies will hereinafter be identified generically with the reference numeral 120. An X-support frame 122 is provided to rigidify the link assemblies 120 of the rear framework, and the link assemblies are interconnected to each other by a bar 123. As with the front framework, it is preferable that the confronting ends of the link members forming at least one of the link assemblies, for instance the members forming link assembly 120e, be formed with a mutually engaging recess and tab that cooperate with each other to hold the lowermost link assembly in a horizontal position. As should be evident from a comparison of the structures illustrated in FIGS. 2 and 4, the link assemblies 120, X-frame 122, and bar 123 are substantially the same as the link assemblies 44, the X-frame 58, and the bar 54 previously described in conjunction with the description of the components illustrated in FIG. 2. Accordingly, these elements will not be further described.

Axles 124 are carried by lower portions of the posts 26 and 28 for supporting wheels 126. Preferably, the axles are an extension of the pivot connection means used to connect ends of the lowermost link elements 82e to the posts 26 and 28. Diagonal supports 128 have lower ends connected by pivot connection means 130 to the link members of the lowermost link assembly 120e and upper ends connected by pivot connection means 132 to the sleeves 96. As can be seen from the phantom line positions illustrated in FIG. 4, the diagonal supports 128 are moved upwardly by the upward movement of the link members of the lowermost link assembly 82e of side framework. Such upward movement of the diagonal supports 98 results in upward movement of the sleeves 96, which is transmitted by the diagonal supports 128 to the lowermost link elements 120e of the rear frameworks. In this manner, conjoint movement of the rear and side frameworks is provided.

Figure 5:
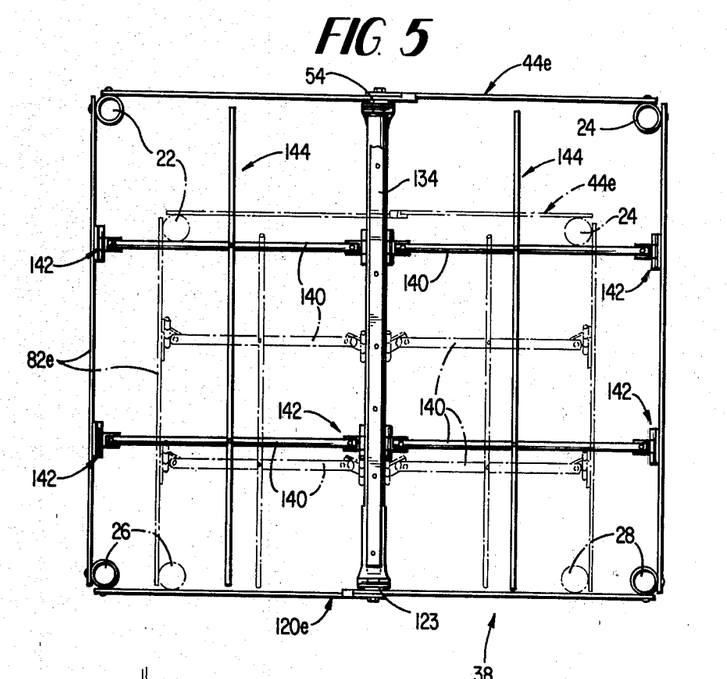
FIG. 5 is a top plan view, similar to FIG. 2, of the bottom of the cart of FIG. 1.
Figure 6:
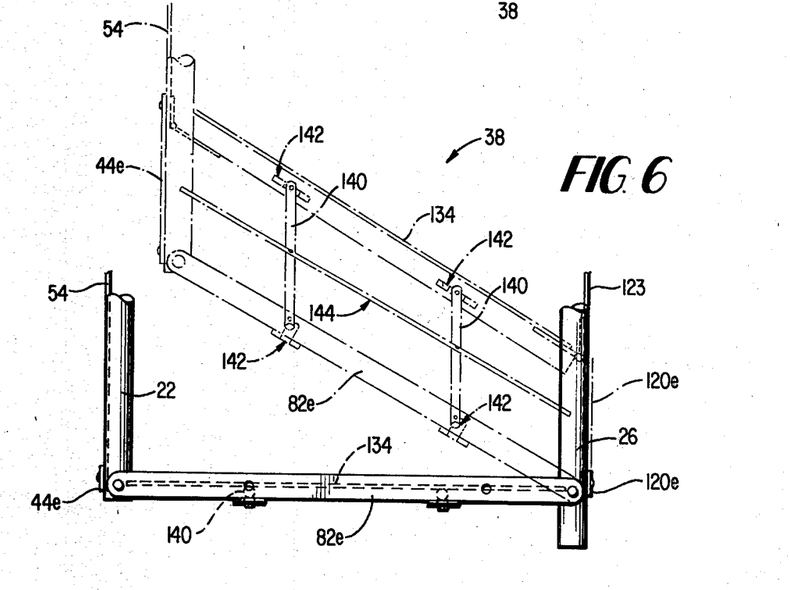
FIG. 6 is a side view similar to FIG. 2, of the bottom of the cart of FIG. 1.

Referring now to FIGS. 5 and 6, the components of the bottom framework 38 are illustrated. The bottom framework 38 includes a central support member 134 located in the middle of the bottom framework and extending between the front and rear frameworks. The leading or front end of the central support member is connected by hinge connection means 136 to the lowermost link assembly 44e. Hinge connection means 138 connect the rear end of the support member to the lowermost link assembly 120e of the rear framework. Use of hinge connection means makes possible movement of the central support member in an arcuate fashion so that the front end of the support member is positioned substantially adjacent the collapsed components of the rear framework when the cart is collapsed. Also, the central support member 134 operatively interconnects lower ends of the bars 54 and 123 so that upward movement of one of the bars acts on the other bar to facilitate conjoint collapsing movement of the front and rear frameworks.

A plurality of bottom members 140 extend between the central support member 134 and lowermost link elements 82e of the side frameworks. Ends of the bottom members are connected by combined hinge and pivot connection means 142 to the link elements and central support member. Use of combined hinge and connection means makes possible upward movement of the ends of the bottom members connected to the central support member when the central support member is moved upwardly by bar 54. Also, when the leading end of the central support member 134 is rotated towards the rear framework, the bottom members 140 rotate so that they are movable into positions adjacent the collapsed components of the rear framework. Preferably, rods 144 are connected to the bottom members 140 to reduce the distances between the various components of the bottom framework. It will be appreciated that the strength of the central support member 134 and the number, positioning, and strength of the bottom members 140 and rods 144 is a function of the size and weight of the article or articles to be transported in the cart.

Figure 7:
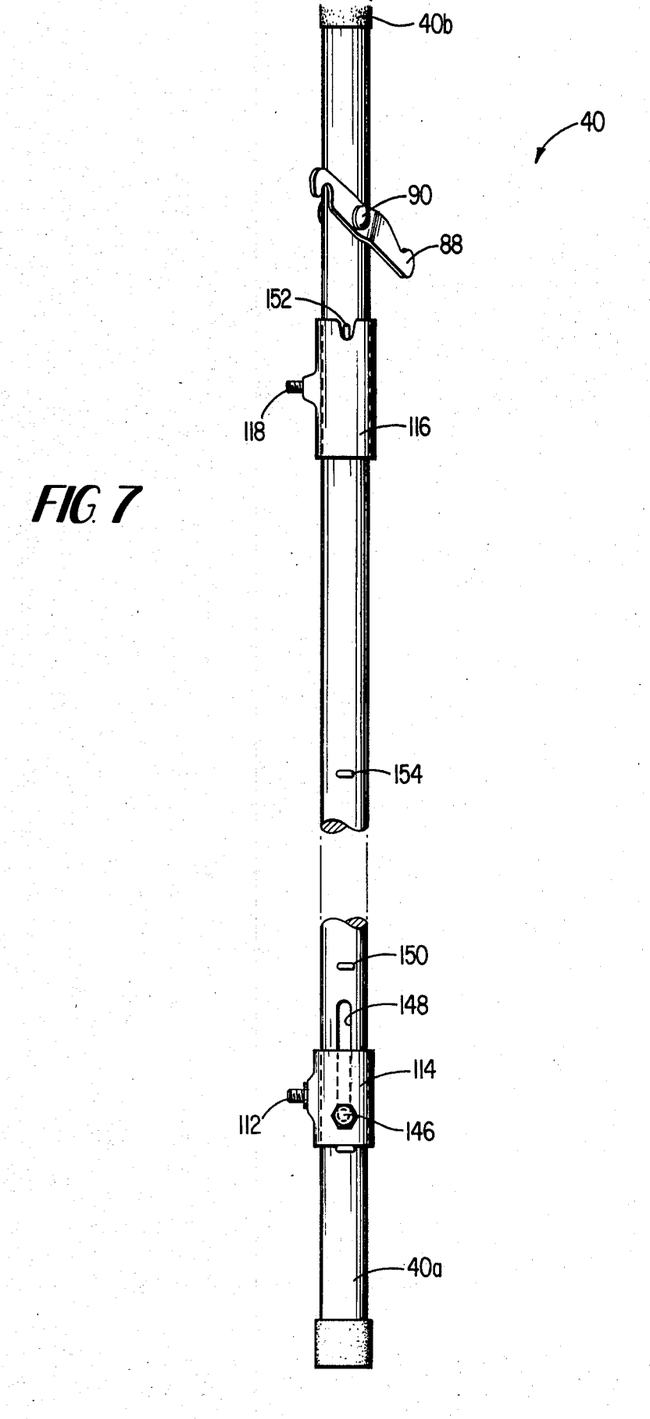
FIG. 7 is a front view of a handle used with the cart of FIG. 1.

Referring now to FIG. 7, the manner of connection of the handles 40 and 42 to the side frameworks 34 and 36, respectively, is illustrated. From FIG. 7, it can be seen that the sleeve 114 pivotally connected to the bracket 110 includes a pin or shaft 146 extending through aligned longitudinally-extending slots formed in side walls of the handles. Engagement of the pin 146 with sides of the slots prevents rotation of the handle with respect to the side framework. Sliding movement of the sleeve 114 with respect to the handle is prevented either by engagement of the pin 146 with the end of the slot 148, or by contact between an upper end of the sleeve and a stop, such as a cotter pin 150, inserted into the handle. The connection between the sleeve, handle, and side framework is such that the handle is able to both translate and rotate with respect to the bracket 110. As previously mentioned, a sleeve 116 is connected to the link element 82a. The handle is translatable within the sleeve between an upper stop 152 and a lower stop 154. Preferably, an upper portion of the sleeve 116 is recessed to receive the upper stop 152 so that engagement between the stop and sleeve opposes rotation of the handle.

Previously, mention has been made of the use of numerous pivot connection means to rotatably connect various components of the present invention. Presently used as suitable pivot connection means for connecting components of the frameworks to the posts are threaded bolts that are first inserted through the component to be connected to one of the posts and then inserted through aligned openings formed in the post. A nut is secured to the end of the bolt protruding from the post in such manner that the length of the shaft of the bolt is greater than the combined thickness of the joined component and outside diameter of the post. If necessary, washers are provided to facilitate rotational movement of the component with respect to the post. Suitable pivot connection means for interconnecting the proximal ends of the link members include rivets having shafts that are longer than the widths of the interconnected link members. After the shafts of the rivets have been passed through openings formed in the link members to be connected, the ends of the shafts are deformed so that the rivets pivotally interconnect the link members. One embodiment of the hinge and connection means 142 utilizes a hinge having one leaf connected to either the central support member 134 or the link element 82e. An end of the bottom member 140 rests on the top surface of the other leaf of the hinge and is pivotally connected thereto by a shaft of a rivet extending through both members. It will be appreciated that the previously described connection means are merely illustrative of numerous suitable pivotal and combined pivotal and hinge members that can be used with the present invention.

In operation, starting with the cart 20 in a fully erected position, the loop 56 is grasped and pulled upwardly to start collapsing of the front framework 30. Since the front framework is operatively connected to the rear framework by the central support member 134, upward movement of the rear framework is also started. Simultaneously, the sleeves 96 move upwards so that both the diagonal supports 98 and the diagonal support assemblies 68, 70 and 104 commence movement of the front framework towards the rear framework. Thus, the cart is simultaneously reduced in breadth and width. Such collapsing movement can be aided by inward pressure exerted on the sides of the cart, for instance, pressure on both of the wheels 126. After the cart has been fully collapsed, that is, the front framework is positioned adjacent the rear framework and the posts 22 and 26 are moved towards the posts 24 and 28, the cart is held in a collapsed condition by engagement of the latching elements 88 with the lock posts 92.

When it is desired to erect the cart, the collapsing action is reversed. Movement of the cart to an erected position is facilitated by the weight of the components of the cart. Engagement between the recesses and tabs of the components of the front and rear frameworks halts movement of the components in the erected condition in which the link assemblies and link elements are substantially horizontal and parallel.

Previously, a specific embodiment of the present invention has been described. It should be appreciated, however, that this embodiment has been described for the purposes of illustration only, without any intention of limiting the scope of the present invention. Rather, it is the intention that the present invention be limited only by the appended claims.

What is claimed is:

1. A collapsible folding cart movable between a first, erected condition and a second, collapsed condition, said cart comprising:

a pair of front corner posts;

a pair of rear corner posts;

means carried by said rear corner posts for rotatably supporting wheels;

a front framework comprising a plurality of vertically spaced link assemblies, an X-frame formed of crossed members having lower ends connected to a lower one of said link assemblies and upper ends connected to an upper one of said link assemblies, and means for releasably locking said front framework in a position holding said link assemblies horizontal each of said link assemblies being comprised of a pair of link members having distal ends pivotally connected to said front corner posts and proximal ends pivotally connected to each other in a central region of the link assembly so that the central region of the link assembly is movable vertically upwards to move the front corner posts towards each other to reduce the width of the front framework;

a rear framework comprising a plurality of vertically spaced link assemblies, an X-frame formed of crossed members having lower ends connected to a lower one of said link assemblies and upper ends connected to an upper one of said link assemblies, and means for releasably locking said front framework in a position holding said link assemblies horizontal, each of said link assemblies being comprised of a pair of link members having distal ends pivotally connected to said rear corner posts and proximal ends pivotally connected to each other in a central region of the link assembly so that the central region of the link assembly is movable vertically upwards to move the rear corner posts towards each other to reduce the width of the rear framework;

a pair of side frameworks comprising a plurality of link elements having end portions pivotally connected to vertically spaced regions on the corner posts on each side of the cart so that the depth of the cart is reduced by moving the front corner posts towards the rear corner posts;

a bottom framework hingedly and pivotally connected to lower portions of said side frameworks and hingedly connected to lower portions of said front and rear frameworks;

longitudinally-extending handles positioned on both sides of the cart and having lower portions extending downwardly from the front of the cart to form legs for supporting the cart and upper portions extending upwardly from the rear of the cart to form grips that are gripped to facilitate cart movement; and means for pivotally connecting said handles to said cart so that said handles are positioned in the first condition of the cart with longitudinal axes thereof extending diagonally upwardly from the front to the rear of the cart, and are positioned in the second condition of the cart with their axes extending generally parallel to the corner posts.

2. A collapsible folding cart according to claim 1, wherein said bottom framework comprises:

a central support member hingedly connected to central portions of lowermost link assemblies of said front and said rear frameworks so that the end of said central support member connected to said front framework is movable towards the rear framework in an upwardly extending arc to reduce the depth of the bottom framework during movement of the cart between its first and second conditions;

a plurality of bottom members extending between said central support member and lowermost link elements of said side frameworks;

means for hingedly and pivotally interconnecting ends of said bottom members with said link elements and said central support member so that said central support member and bottom members are upwardly movable to reduce the width of said bottom framework and are movable towards the rear framework to reduce the depth of said bottom framework; and a plurality of bottom rods carried by said bottom members and extending parallel to said central support member.

3. A collapsible folding cart according to claim 1, wherein said cart further comprises:

sleeves guided for vertical movement on lower portions of said rear posts;

first diagonal support members having upper ends connected to a respective one of said sleeves and lower ends pivotally connected to a lowermost link element of one of said side framework; and second diagonal support members having upper ends pivotally connected to a respective one of said sleeves and lower ends pivotally connected to a lowermost link assembly of said rear framework, said sleeves and said first and said second diagonal support members cooperating with each other to facilitate conjoint movement of said front posts towards said rear posts, and movement of said rear posts towards each other.

4. A collapsible folding cart according to claim 1, wherein said means for pivotally connecting said handles to said cart comprises:

a first diagonal support assembly having a lower end connected to a lowermost link element of one of said side frameworks and extending diagonal upwards towards one of the front corner posts;

sleeve means including a first sleeve for receiving therethrough said handle, said sleeve means including means for preventing rotation of a received handle with respect to said sleeve;

means for pivotally connecting said sleeve means with said first diagonal support assembly;

a second diagonal support assembly having two interconnected support elements, a first of the support elements having a lower end pivotally connected to the lowermost link assembly of the front framework and an upper end extending towards the closest corner post, a second of the support elements having a lower end pivotally connected to the upper end of the first support element, an upper end positioned in close proximity to an upper end of the first diagonal support assembly, and an intermediate portion pivotally connected to one of said front corner posts;

means for interconnecting upper ends of said diagonal support assemblies such that said front and side support assemblies are movable in perpendicular planes; and a second sleeve pivotally connected to the uppermost link element of one of said side frameworks for receiving therethrough said handle.

5. A collapsible folding cart movable between a first, erected condition and a second, collapsed condition, said folding cart in the erected condition comprising:

a first pair of spaced apart upstanding corner posts forming front corner edges of said cart;

a second pair of spaced apart upstanding corner posts forming rear corner edges of said cart;

a front framework having side portions pivotally connected to respective ones of said first pair of corner posts;

a rear framework having side portions pivotally connected to respective ones of said second pair of corner posts;

each of said front and rear frameworks comprising a plurality of vertically spaced, horizontally extending link assemblies; a collapsible X-frame having a pair of crossed members with lower ends pivotally connected to a lower one of said link assemblies and upper ends pivotally connected to an upper one of said link assemblies, and means for releasably locking the front and rear frameworks in positions holding their link assemblies horizontal and parallel with each other; and bar means positioned between the pairs of corner posts and pivotally connected to the link assemblies for moving said link assemblies conjointly in the vertical direction during movement of said cart between said first and said second conditions;

each of said link assemblies comprising a pair of link members having distal ends pivotally connected to one of said corner posts and confronting proximal ends, and first connection means for pivotally connecting the confronting proximal ends to each other so that the posts of said first pair of corner posts are movable towards each other and the posts of said second pair of corner posts are movable towards each other during movement of said cart between its first and second conditions;

first and second side frameworks pivotally connected between respective ones of said first and said second pairs of corner posts, each of said side frameworks comprising a plurality of vertically spaced, horizontally extending link elements having ends pivotally connected to respective ones of said corner posts so that said first pair of posts are movable in vertical planes towards said second pair of posts during movement of said cart between its first and second conditions;

axles carried by lower ends of said second pair of corner posts;

wheels rotatably mounted on said axles for supporting said cart;

a collapsible bottom framework carried by and connected to lower portions of said front, side, and rear frameworks;

handle means spaced from and carried by each of said side frameworks, each of said handle means having a lowermost portion extending downwardly below a front portion of the bottom framework to form a leg for supporting the cart, an uppermost portion extending above the frameworks to form a handle, and a longitudinally-extending intermediate portion interconnecting the lowermost and uppermost portions;

means for movably connecting a lower portion of each of said handle means to its associated side framework comprising first and second diagonal support assemblies having confronting upper ends, and corner connection means for interconnecting the upper ends with each other so that the diagonal support assemblies are movable in perpendicular planes; said first diagonal support assembly having a lower end portion pivotally connected to the lowermost link element, an upper end portion connected to said corner connection means, and an intermediate portion pivotally supporting a sleeve receiving one of said handles in such manner that the sleeve and handle are movable during movement of the cart between its first and second conditions to position the longitudinal axis of the intermediate portion of said handle means substantially parallel with the corner posts; and said second diagonal support assembly having a lower member with a lower end portion pivotally connected to the lowermost link assembly of the front framework and an upper end portion extending towards the closest corner post, and an upper member with a lower end portion pivotally connected to the upper end portion of the lower member, an upper end portion connected to the corner connection means, and a portion intermediate the end portions pivotally connected to its associated corner post.

* * * * *